United States Patent
Noh et al.

(10) Patent No.: US 11,317,361 B2
(45) Date of Patent: Apr. 26, 2022

(54) METHOD AND APPARATUS FOR CONTROLLING TRANSMISSION POWER IN WIRELESS COMMUNICATION SYSTEM

(71) Applicant: Samsung Electronics Co., Ltd., Gyeonggi-do (KR)

(72) Inventors: Hoondong Noh, Gyeonggi-do (KR); Jinhyun Park, Gyeonggi-do (KR); Youngwoo Kwak, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/707,737

(22) Filed: Dec. 9, 2019

(65) Prior Publication Data

US 2020/0187134 A1 Jun. 11, 2020

(30) Foreign Application Priority Data

Dec. 7, 2018 (KR) .................. 10-2018-0157483

(51) Int. Cl.
*H04W 52/42* (2009.01)
*H04W 52/14* (2009.01)

(52) U.S. Cl.
CPC ......... *H04W 52/42* (2013.01); *H04W 52/146* (2013.01)

(58) Field of Classification Search
CPC .......................... H04W 52/42; H04W 52/146
See application file for complete search history.

(56) References Cited

U.S. PATENT DOCUMENTS

| | | | | |
|---|---|---|---|---|
| 2009/0046569 A1* | 2/2009 | Chen | ..................... | H04L 5/0007 370/203 |
| 2017/0373735 A1* | 12/2017 | Kim | ..................... | H04L 5/0051 |
| 2018/0115444 A1* | 4/2018 | Lee | ................... | H04L 25/03904 |
| 2018/0248720 A1* | 8/2018 | Park | ................... | H04L 25/03929 |
| 2018/0316469 A1* | 11/2018 | Jiang | ..................... | H04W 76/27 |
| 2018/0332541 A1* | 11/2018 | Liu | ..................... | H04W 52/241 |
| 2019/0342062 A1* | 11/2019 | Ren | ..................... | H04L 5/0021 |
| 2020/0021411 A1* | 1/2020 | Ren | ..................... | H04L 41/0853 |
| 2020/0083939 A1* | 3/2020 | Park | ................. | H04W 72/1268 |

(Continued)

FOREIGN PATENT DOCUMENTS

| | | |
|---|---|---|
| WO | WO 2017/047971 | 3/2017 |
| WO | WO-2019-078687 | 4/2019 |

OTHER PUBLICATIONS

Vlvo, R1-1812326_Discussion on low PAPR RS, 3GPP TSG RAN WG1 Meeting #95, 2018 (Year: 2018).*

(Continued)

*Primary Examiner* — Lewis G West
(74) *Attorney, Agent, or Firm* — The Farrell Law Firm, P.C.

(57) ABSTRACT

A method of operating a terminal for controlling transmission power of the terminal in a wireless communication system is provided. The method includes receiving, from a base station, a set of first sequences and an identifier for indicating uplink precoding information, generating a set of second sequences based on the set of first sequences and the uplink precoding information, and transmitting, to the base station, the set of second sequences at antenna ports, wherein each of the antenna ports corresponds to each sequence included in the set of second sequences, and wherein at least one of the set of first sequences and the uplink precoding information is generated based on at least one coefficient.

15 Claims, 10 Drawing Sheets

(56) References Cited

U.S. PATENT DOCUMENTS

2020/0186310 A1* 6/2020 Yang .................... H04L 5/0051
2021/0314995 A1* 10/2021 Kim .................. H04W 72/1273
2021/0352613 A1* 11/2021 Yoon .................. H04W 52/325

OTHER PUBLICATIONS

MediaTek, R1-1810437 Low PAPR RS v5,3GPP TSG RAN WG1 Meeting #94bis, 2018 (Year: 2018).*
3GPP, R1-1810437 Low PAPR RS v5,3GPP TSG RAN WG1 Meeting #94bis, Oct. 2018 (Year: 2018).*
Vivo, "Discussion on Low PAPR RS", R1-1812326, 3GPP TSG RAN WG1 Meeting #95, Nov. 12-16, 2018, 9 pages.
MediaTek Inc., "Low PAPR RS", R1-1810437, 3GPP TSG RAN WG1 Meeting #94bis, Oct. 8-12, 2018, 12 pages.
Intel Corporation, "Low PAPR Reference Signals", R1-1813892, 3GPP TSG RAN WG1 Meeting #95, Nov. 12-16, 2018, 14 pages.
International Search Report dated Mar. 20, 2020 issued in counterpart application No. PCT/KR2019/017236, 10 pages.

* cited by examiner $$\begin{bmatrix} a_{k,l}^{(p_0,\mu)}(m) \\ \vdots \\ a_{k,l}^{(p_{\rho-1},\mu)}(m) \end{bmatrix} = \beta_{PUSCH}^{DMRS} W \begin{bmatrix} \tilde{a}_{k,l}^{(\tilde{p}_0,\mu)}(m) \\ \vdots \\ \tilde{a}_{k,l}^{(\tilde{p}_{\rho-1},\mu)}(m) \end{bmatrix} \quad (5\text{-}00)$$

Sequence mapping at UL TX antenna ports (5-10)

Sequence mapping at UL TX antenna ports (5-05)

METHOD AND APPARATUS FOR CONTROLLING TRANSMISSION POWER IN WIRELESS COMMUNICATION SYSTEM

CROSS-REFERENCE TO RELATED APPLICATION

This application is based on and claims priority under 35 U.S.C. § 119 to Korean Patent Application No. 10-2018-0157483, filed on Dec. 7, 2018, in the Korean Intellectual Property Office, the disclosure of which is incorporated by reference herein in its entirety.

BACKGROUND

1. Field

The disclosure relates generally to a method of controlling transmission power in a wireless communication system, and more particularly, to a method of efficiently allocating transmission power of antenna ports in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called "beyond 4G network" communication systems or "post long term evolution (post-LTE)" systems. 5G communication systems defined by $3^{rd}$ Generation Partnership Project (3GPP) are referred to as new radio (NR) systems. To achieve high data rates, implementation of 5G communication systems in an ultra-high frequency or millimeter-wave (mmWave) band (for example, a 60-gigahertz (GHz) band) is being considered. To reduce path loss of radio waves and to increase transmission distance of radio waves in an ultra-high frequency band, in 5G communication systems, technologies such as beamforming, massive multiple-input and multiple-output (massive MIMO), full-dimensional MIMO (FD-MIMO), array antennas, analog beamforming, and large-scale antennas have been discussed and applied to NR systems. To improve system networks for 5G communication systems, various technologies, such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved to the Internet of things (IoT), where distributed elements such as objects exchange information with each other to process the information. In addition, Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As various services may be provided according to the advances in mobile communication systems as described above, methods for effectively providing these services are required.

SUMMARY

The present disclosure has been made to address the above-mentioned problems and disadvantages, and to provide at least the advantages described below.

In accordance with an aspect of the disclosure, a method of operating a terminal for controlling transmission power of the terminal in a wireless communication system is provided. The method includes receiving, from a base station, a set of first sequences and an identifier for indicating uplink precoding information, generating a set of second sequences based on the set of first sequences and the uplink precoding information, and transmitting, to the base station, the set of second sequences at antenna ports, wherein each of the antenna ports corresponds to each sequence included in the set of second sequences, and wherein at least one of the set of first sequences and the uplink precoding information is generated based on at least one coefficient.

In accordance with another aspect of the disclosure, a terminal for controlling transmission power of the terminal in a wireless communication system is provided. The terminal includes a transceiver, and at least one processor configured to receive, from a base station, a set of first sequences and an identifier for indicating uplink precoding information, generate a set of second sequences based on the set of first sequences and the uplink precoding information, and transmit, to the base station, the set of second sequences at antenna ports, wherein each of the antenna ports corresponds to each sequence included in the set of second sequences, and wherein at least one of the set of first sequences and the uplink precoding information is generated based on at least one coefficient.

In accordance with another aspect of the disclosure, a method of operating a base station for controlling transmission power of a terminal in a wireless communication system is provided. The method includes transmitting, to the terminal, a set of first sequences and an identifier for indicating uplink precoding information, and receiving, from the terminal, a set of second sequences at antenna ports, wherein each of the antenna ports corresponds to each sequence included in the set of second sequences, wherein the set of second sequences is generated based on the set of first sequences and the uplink precoding information, and wherein at least one of the set of first sequences and the uplink precoding information is generated based on at least one coefficient.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
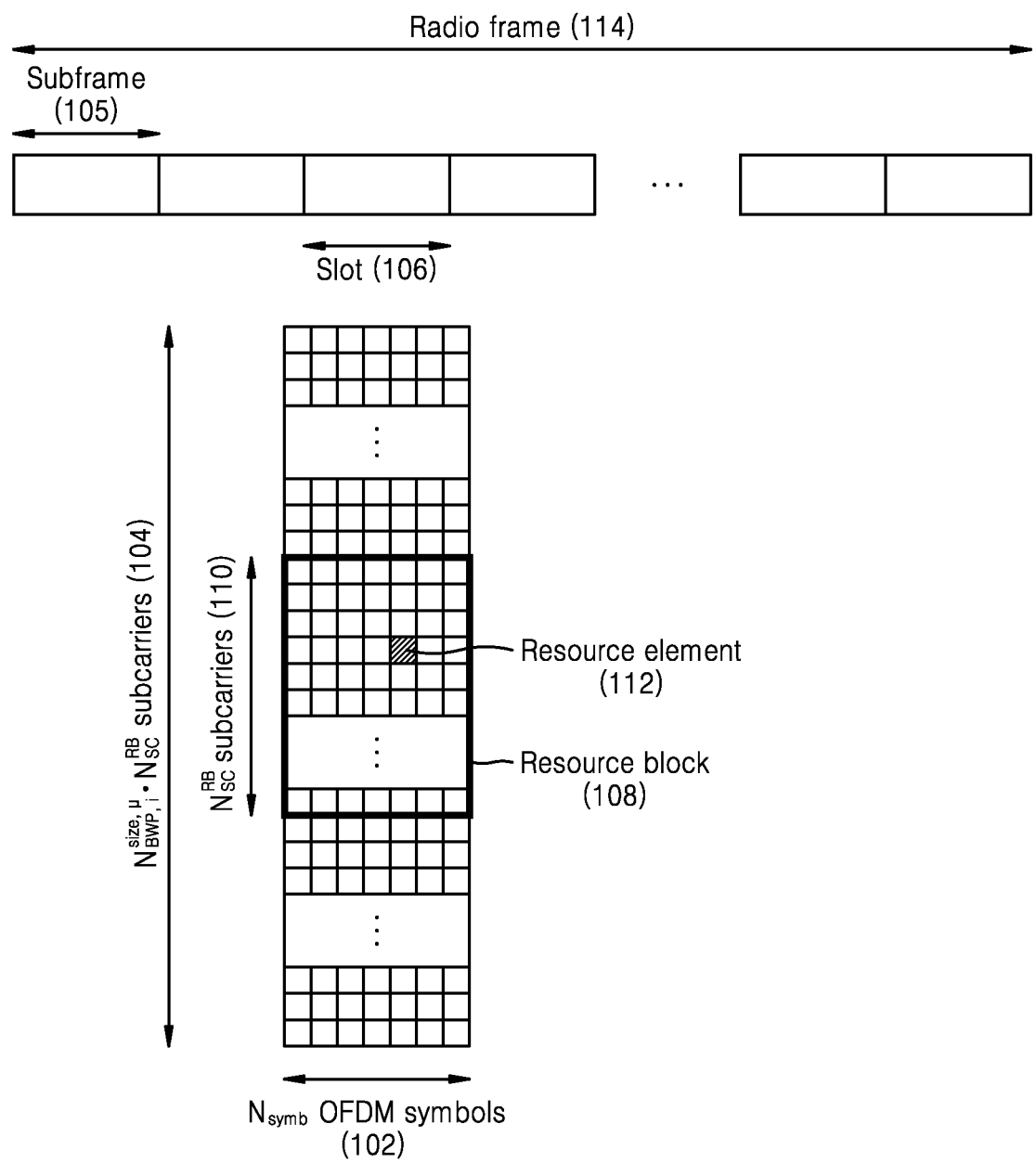
FIG. 1 is a diagram illustrating an architecture of a time-frequency domain that is a radio resource domain in which data or a control channel is transmitted in a downlink of a wireless communication system, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

In describing embodiments of the disclosure, technical descriptions well known in the art and not related directly to the disclosure will be omitted. This is for more clearly delivering the subject matter of the disclosure without ambiguity by omitting unnecessary descriptions.

For similar reasons, in the accompanying drawings, some components are exaggerated, omitted, or briefly illustrated. In addition, the size of each component does not completely reflect the actual size thereof.

The advantages and features of the disclosure, and methods of achieving the same will become apparent from the detailed description of the following embodiments of the disclosure in conjunction with the accompanying drawings. However, it should be understood that the disclosure is not limited to the following embodiments and may be embodied in different ways.

The embodiments of the disclosure are provided only for complete disclosure and thorough understanding of the disclosure by those of ordinary skill in the art, and the scope of the disclosure is defined only by the accompanying claims and equivalents thereof.

Throughout the disclosure, the expression "at least one of a, b or c" indicates only a, only b, only c, both a and b, both a and c, both b and c, all of a, b, and c, or variations thereof.

In the disclosure, a controller may also be referred to as a processor.

Throughout the disclosure, a layer (or a layer apparatus) may also be referred to as an entity.

It will be understood that each block of a flowchart illustration and combinations of blocks in the flowchart illustration may be implemented by computer program instructions. Because these computer program instructions may be loaded into processors of general-purpose computers, special-purpose computers, or other programmable data processing apparatuses, the instructions executed via processors of the computers or other programmable data processing apparatuses create a means for implementing the functions specified in the flowchart block(s). Because these computer program instructions may also be stored in computer usable or computer readable memory capable of directing computers or other programmable data processing apparatuses to function in a particular manner, the instructions stored in the computer usable or computer readable memory may produce an article of manufacture including instruction means for implementing the functions specified in the flowchart block(s). Because the computer program instructions may be loaded onto a computer or other programmable data processing apparatuses, a series of operational steps may be performed on the computer or other programmable data processing apparatuses to produce a computer implemented process, and thus, the instructions executed on the computer or other programmable data processing apparatuses may provide processes for implementing the functions specified in the flowchart block(s).

In addition, each block may represent a module, segment, or portion of code, which includes one or more executable instructions for implementing the specified logical function(s). Further, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

As used herein, a term ending in "unit" or a term ending in "er" or "or" refers to a software component or a hardware component such as a field programmable gate array (FPGA) or an application-specific integrated circuit (ASIC) to perform certain functions. However, the meaning of a term ending in "unit" or a term ending in "er" or "or" is not limited to software or hardware. A term ending in "unit" or a term ending in "er" or "or" may be in an addressable storage medium or may be configured to regenerate one or more processors. Therefore, as an example, a term ending in "unit" or a term ending in "er" or "or" includes components, such as software components, object-oriented software components, class components, and task components, processes, functions, attributes, procedures, subroutines, segments of program code, drivers, firmware, microcode, circuitry, data, databases, data structures, tables, arrays, and variables. A function provided in components ending in "unit" or ending in "er" or "or" may be combined into fewer components or may be further divided into additional components. In addition, components and terms ending in "unit" or ending in "er" or "or" may be implemented to regenerate one or more central processing units (CPUs) in a device or a secure multimedia card. Further, in an embodiment of the disclosure, a term ending in "unit" or ending in "er" or "or" may include one or more processors.

In specifically describing embodiments of the disclosure, although a new radio access network (new RAN) and a packet core (5G system, 5G core network, or next generation (NG) core) respectively corresponding to a RAN and a core network in 5G mobile communication specifications defined by 3GPP, which is a standardization organization for mobile communication specifications, are primary subjects, the subject matter of the disclosure may also be applied to other communication systems having similar technical backgrounds through some changes thereof made by those of ordinary skill in the art without departing from the spirit and scope of the disclosure.

Hereinafter, for descriptive convenience, some of terms and names defined in the 3GPP LTE specifications (i.e., specifications of 5G, NR, LTE, or similar systems thereto) may be used. However, the disclosure is not limited to the terms and names set forth above and may be equally applied to systems complying with other specifications.

In addition, in the following description, terms for identifying an access node, terms referring to network entities, terms referring to messages, terms referring to an interface between network entities, and terms referring to various pieces of identification information are used as examples, for descriptive convenience. Therefore, the disclosure is not limited to terms used herein, and other terms referring to objects having equivalent technical meanings may be used.

A detailed description of known functions and configurations incorporated herein will be omitted when it may make the subject matter of the disclosure unclear. Hereinafter, embodiments of the disclosure will be described in detail with reference to the accompanying drawings.

Wireless communication systems have gone beyond mainly providing voice services and have been developed into broadband wireless communication systems which provide high-speed and high-quality packet data services such as communication standards, for example, high speed packet access (HSPA) of 3GPP, LTE (or evolved universal terrestrial radio access (E-UTRA)), LTE-Advanced (LTE-A), high rate packet data (HRPD) of 3GPP2, and 802.16e of the Institute of Electrical and Electronics Engineers (IEEE). In addition, communication standards of 5G or NR are being made by way of $5^{th}$ generation wireless communication systems.

In an NR system as a representative example of a broadband wireless communication system, an orthogonal frequency division multiplexing (OFDM) method is used in a downlink (DL), and both a discrete Fourier transform spread OFDM (DFT-s-OFDM) method and the OFDM method are used in an uplink (UL). The UL may denote a radio link via which a user equipment (UE) or a mobile station (MS) transmits data or a control signal to a 5G base station (gNB) (or a base station (BS)), and the DL may denote a radio link via which the gNB transmits data or a control signal to the UE. In general, in multiple access methods as above, time-frequency resources for carrying data or control information on a user basis are allocated and operated not to overlap each other, that is, to allow orthogonality to be established, and thus, data or control information of each user may be distinguished.

An NR system according to an embodiment of the disclosure uses a hybrid automatic repeat request (HARQ) method in which, when a decoding failure occurs in initial transmission, the corresponding data is retransmitted in a physical layer. In the HARQ method, when a receiver does not accurately decode data, the receiver may transmit information for informing a decoding failure, that is, a negative acknowledgement (NACK), to a transmitter, and thus, the transmitter may retransmit the corresponding data in a physical layer. The receiver may combine the data retransmitted by the transmitter with the previously decoding-failed data and thus improve data reception performance. In addition, when the receiver accurately decodes data, the receiver may transmit information for informing about a decoding success, that is, an acknowledgement (ACK), to the transmitter, and thus, the transmitter may transmit new data.

In release 15 NR (Rel-15 NR), when a large number of UL demodulation reference signal (DMRS) ports are allocated to a UE, the DMRS ports may use the same initialization value within the same OFDM symbol and thus use the same sequence value within the same resource element (RE). One or more DMRS ports simultaneously allocated to one UE may be summed up (i.e., a weight sum) by a UL codebook indicated by the gNB, mapped to a UL antenna port, and then transmitted. Here, because a single codebook is applied to the whole UL band from the viewpoint of one UE, when transmission power for each UL antenna is different after the UL antenna port mapping, an UL transmission power backoff may need to be increased in consideration thereof. Thus, according to the disclosure, a method of solving a transmission power imbalance in a UL antenna port by improving a UL codebook may be provided. As an example, a gNB and a UE may change a phase of a UL codebook for each given frequency band in accordance with a pre-defined method.

Figure 2:
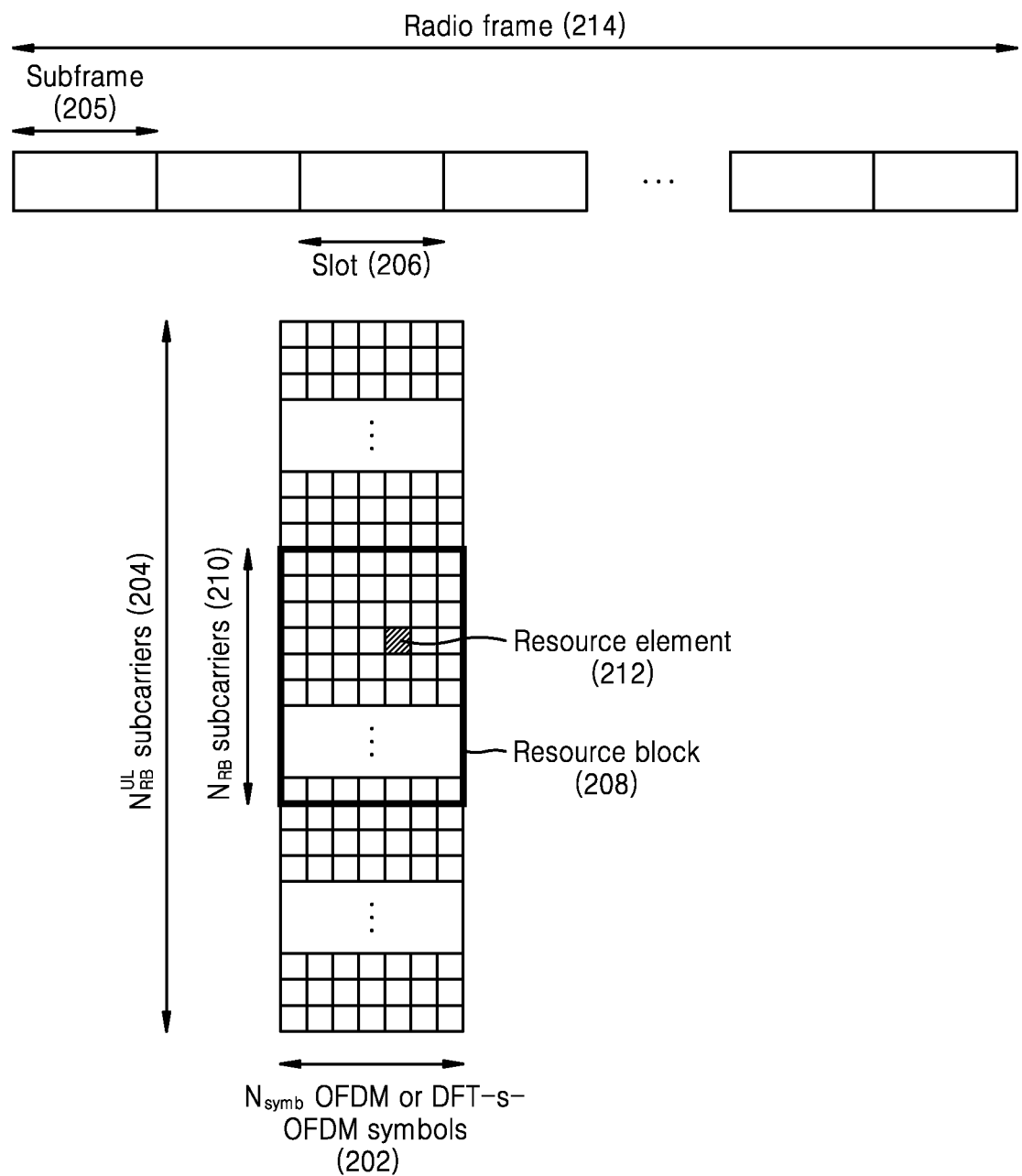
FIG. 2 is a diagram illustrating an architecture of a time-frequency domain that is a radio resource domain in which data or a control channel is transmitted in an uplink of a wireless communication system, according to an embodiment.

FIG. 1 is a diagram illustrating an architecture of a time-frequency domain that is a radio resource domain in which data or a control channel is transmitted in a DL of a wireless communication system, according to an embodiment. FIG. 2 is a diagram illustrating an architecture of a time-frequency domain that is a radio resource domain in which data or a control channel is transmitted in an uplink of a wireless communication system, according to an embodiment.

In FIGS. 1-2, the horizontal axis represents a time domain, and the vertical axis represents a frequency domain.

A minimum transmission unit in the frequency domain is a subcarrier, and NR may support a total of 5 subcarrier spacings or numerologies as shown in the following Table 1. In Table 1, Δf is an absolute value of a numerology, and μ represents an index of each numerology.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |

TABLE 1-continued

| μ | $\Delta f = 2^\mu \cdot 15$ [kHz] | Cyclic prefix |
|---|---|---|
| 3 | 120 | Normal |
| 4 | 240 | Normal |

A UE in NR may be given one or more bandwidth parts (BWPs) including some bands within the whole system band, and a position of a start resource block (RB) of an $i^{th}$ BWP and the length of an RB may be determined by parameters $N_{BWP,i}^{start,\mu}$ and $N_{BWP,i}^{size,\mu}$ which are set to an upper layer. A gNB may indicate one of BWPs set by a downlink control indicator (DCI), and may transmit a DL signal to some or all bands of the indicated BWP or allow the UE to transmit a UL signal. Here, one of the BWPs set forth above may include a total of $N_{BWP,i}^{start,\mu} \times N_{sc}^{RB}$ subcarriers 104. Here, $N_{sc}^{RB}=12$ may denote the number of subcarriers constituting one RB.

A minimum transmission unit in the time domain is an OFDM symbol, and $N_{symb}=14$ OFDM symbols 102 may be aggregated and constitute one slot 106. One subframe 105 may include one or more slots, and ten subframes may be aggregated and constitute one radio frame 114. Here, the number of slots constituting one subframe, that is, ($N_{slot}^{subframe,\mu}$), may be determined as shown in the following Table 2, according to a numerology.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The length of the subframe set forth above is 1.0 milliseconds (ms), and the length of the slot may decrease in inverse proportion to a subcarrier spacing, based on a subcarrier spacing of 15 kilohertz (kHz) (μ=15 kHz). For example, the length of the slot may be 0.5 ms, 0.25 ms, 0.125 ms, and 0.0625 ms at μ=30 kHz, 60 kHz, 120 kHz, and 240 kHz, respectively.

A basic unit of a resource in a time-frequency domain is an RE 112 and may be represented by an OFDM symbol index and a subcarrier index. An RB (or physical resource block (PRB)) 108 may be defined by both $N_{symb}$ consecutive OFDM symbols 102 in the time domain and $N_{sc}^{RB}$ consecutive subcarriers 110 in the frequency domain. Accordingly, one RB 108 may include $N_{symb} \times N_{sc}^{RB}$ REs 112. As described above, although $N_{symb}=7$ and $N_{sc}^{RB}=12$ may be generally given in an NR system, this is merely an example, and the disclosure is not limited to the values set forth above.

In NR, for the UE to efficiently receive a control channel, various DCI formats as shown in Table 3 may be provided according to usage purposes, as shown below.

TABLE 3

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 3-continued

| DCI format | Usage |
|---|---|
| 2_2 | Transmission of TPC commands for PUCCH and PUSCH |
| 2_3 | Transmission of a group of TPC commands for SRS transmissions by one or more UEs |

For example, the gNB may use DCI format 0_0 or DCI format 0_1 for scheduling a physical downlink shared channel (PDSCH) in one cell.

When DCI format 0_0 is transmitted with a cyclic redundancy check (CRC) scrambled by a cell radio network temporary identifier (C-RNTI), a configured scheduling RNTI (CS-RNTI), or a new-RNTI, DCI format 0_0 may include at least the following pieces of information:

Identifier for DCI formats (1 bit): a DCI format indicator always set to 1;

Frequency domain resource assignment: indicates frequency axis resource assignment;

Time domain resource assignment: indicates time axis resource assignment;

Frequency hopping flag: an indicator informing whether frequency hopping is applied;

Modulation and coding scheme (MCS): indicates a modulation order and a coding rate, both used for physical uplink shared channel (PUSCH) transmission;

New data indicator (NDI): indicates, according to toggling or not thereof, whether a PUSCH corresponds to either initial transmission or retransmission;

Redundancy version: indicates a redundancy version used for PUSCH transmission; and HARQ process number: indicates a HARQ process number used for PUSCH transmission.

When DCI format 0_1 is transmitted with CRC scrambled by a C-RNTI, a CS-RNTI, a semi persistent CSI RNTI (SP-CSI-RNTI), or a new-RNTI, DCI format 0_0 may include at least the following pieces of information:

Identifier for DCI formats (1 bit): a DCI format indicator always set to 1;

Carrier indicator: an indicator informing about a cell (carrier) index where data is transmitted;

BWP indicator: an indicator informing information about a BWP, e.g., where data is transmitted;

Frequency domain resource assignment: indicates frequency axis resource assignment;

Time domain resource assignment: indicates time axis resource assignment;

Frequency hopping flag: an indicator informing whether frequency hopping is applied;

Modulation and coding scheme (MCS): indicates a modulation order and a coding rate, both used for PUSCH transmission;

New data indicator (NDI): indicates, according to toggling or not thereof, whether a PUSCH corresponds to either initial transmission or retransmission;

Redundancy version: indicates a redundancy version used for PUSCH transmission;

HARQ process number: indicates a HARQ process number used for PUSCH transmission Downlink assignment index: a DAI indicator;

Transmit Power Control (TPC) command for scheduled PUSCH: a PUSCH power control indicator;

Sounding reference signal (SRS) resource indicator (SRI): indicates one SRS resource included in an SRS resource set in which the value of an upper layer parameter "usage" is designated as "codebook" or "noncodebook";

Precoding information and number of layers (transmission precoding matrix indicator (TPMI)): indicate the number of layers and precoding information, both used for UL transmission by a UE, when the value of an upper layer parameter "txConfig" is set to "codebook"; and Antenna ports: indicate a DMRS port and a code division multiplexing (CDM) group index, both used for UL transmission.

As can be seen from the pieces of information included in DCI format 0_1 described above, two UL transmission methods, that is, "codebook-based UL transmission" and "non-codebook-based UL transmission", may be provided in NR.

Figure 3:
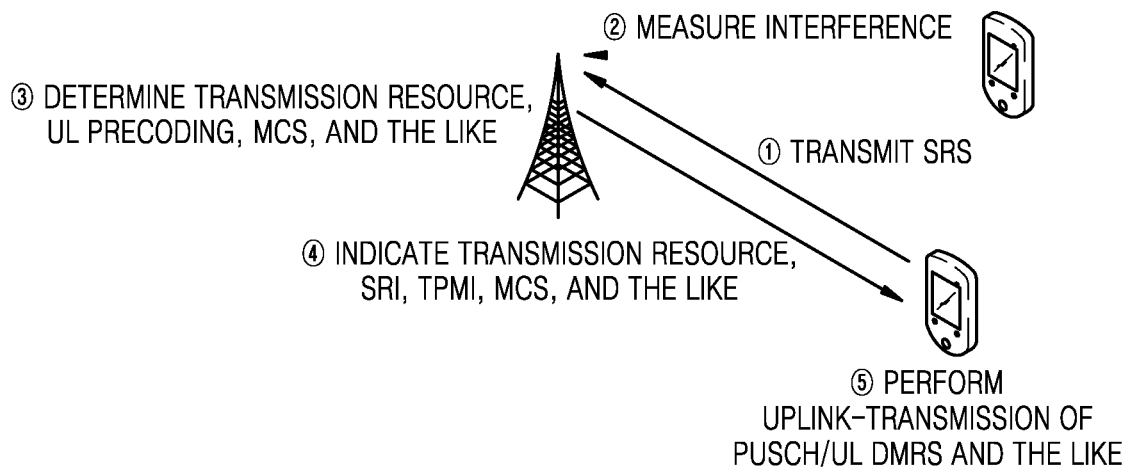
FIG. 3 is a diagram illustrating a codebook-based uplink transmission procedure, according to an embodiment.

FIG. 3 is a diagram illustrating a codebook-based UL transmission procedure, according to an embodiment.

Referring to FIG. 3, a UE may transmit an SRS in accordance with settings or indications of a gNB. In addition, the gNB may appropriately receive a UL signal of another UE and thus may measure interference. Next, the gNB may determine a UL resource, an SRS resource, UL precoding (UL codebook), and an MCS, to be used by the corresponding UE, based on the received SRS and an interference signal. The gNB may indicate time/frequency domain assignment, an SRI, and a wideband TPMI, which correspond to the determined pieces of information set forth above, to the UE through a UL grant such as DCI format 0_1. In the case of codebook-based UL transmission, the gNB may directly indicate a precoding matrix applied to a PUSCH and a UL DMRS through the TPMI. When successfully receiving the corresponding UL grant, the UE may perform UL transmission of the PUSCH, the SRS, and the UL DMRS, in accordance with the content of the UL grant.

Figure 4:
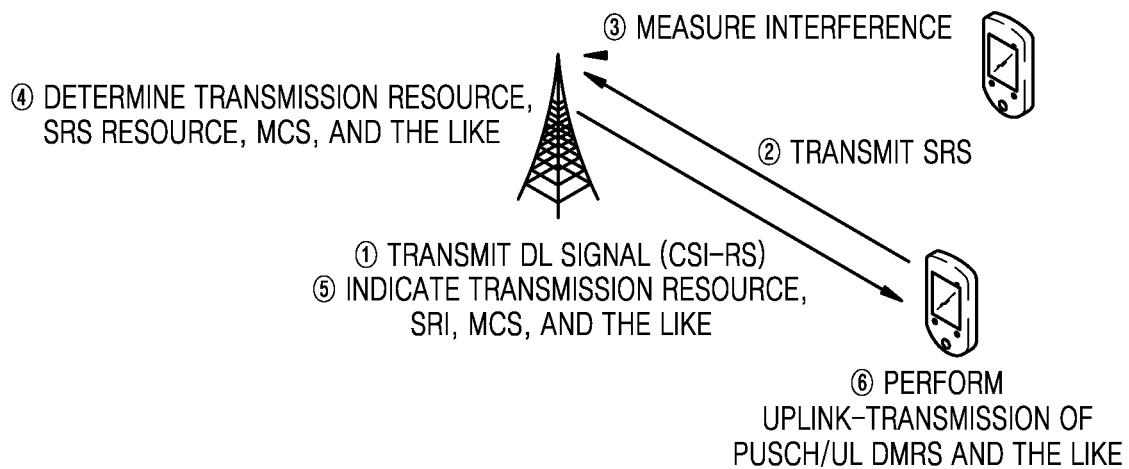
FIG. 4 is a diagram illustrating a non-codebook-based uplink transmission procedure, according to an embodiment.

FIG. 4 is a diagram illustrating a non-codebook-based UL transmission procedure, according to an embodiment.

Referring to FIG. 4, a gNB may transmit a DL signal such as a channel state information reference signal (CSI-RS) to a UE and thus allow the UE to determine transmission and reception beam directions based thereon. Next, the UE may transmit an SRS in a beam direction measured from, for example, an associated CSI-RS, in accordance with settings or indications of the gNB. In addition, the gNB may appropriately receive a UL signal of another UE and thus may measure interference. Next, the gNB may determine a UL resource, an SRS resource, and an MCS, to be used by the corresponding UE, based on the received SRS and an interference signal. The gNB may indicate time/frequency domain assignment, and an SRI, which correspond to the determined pieces of information set forth above, to the UE through a UL grant such as DCI format 0_1. In the case of non-codebook-based UL transmission, the gNB may implicitly indicate precoding applied to a PUSCH and a UL DMRS through the SRI. When successfully receiving the corresponding UL grant, the UE may perform UL transmission of the PUSCH, the SRS, and the UL DMRS, in accordance with the content of the UL grant.

As described above, when the UE is set to perform codebook-based UL transmission, the UE may need to perform "UL transmission (TX) antenna port mapping of PUSCH data" and "UL TX antenna port mapping of UL DMRS sequence" in accordance with power control information (TPC command) or a TPMI, which the gNB indicates.

Figure 5:
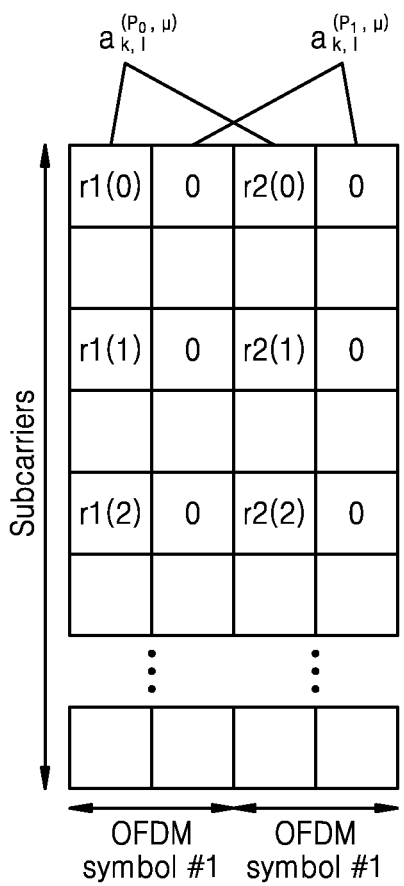
FIG. 5 is a diagram illustrating an example of the allocation of uplink antenna port transmission power in codebook-based uplink transmission, according to an embodiment.
Figure 5:
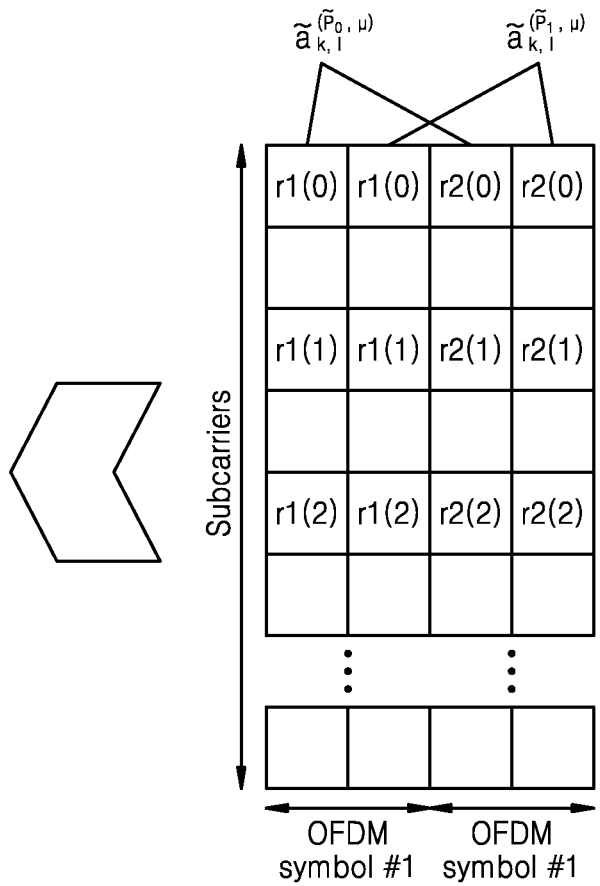

FIG. 5 is a diagram illustrating an example of the allocation of UL antenna port transmission power in codebook-based UL transmission, according to an embodiment of the disclosure. More particularly, FIG. 5 is a diagram illustrating an example of "UL TX antenna port mapping of a UL DMRS sequence" when a UE is set to perform codebook-based UL transmission.

Referring to 5-00 of FIG. 5, the UE may generate signals $a_{k,l}^{(p_0,\mu)} \sim a_{k,l}^{(p_{\rho-1},\mu)}$, which are to be transmitted on UL TX antenna ports $p_0 \sim p_{\rho-1}$ in a $k^{th}$ subcarrier and an $l^{th}$ RE, by multiplying a sequence $\tilde{a}_{k,l}^{(\tilde{p}_0,\mu)} \sim \tilde{a}_{k,l}^{(\tilde{p}_v,\mu)}$ generated by Equation (1) by an amplitude scaling factor $\beta_{PUSCH}^{DMRS}$ and a UL precoder W.

$$\tilde{a}_{k,l}^{(\tilde{p}_i,\mu)} = w_i(k')w_l(l')r(2n+k') \qquad (1)$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

$$j = 0, 1, \ldots, \upsilon - 1$$

In Equation (1), $w_f(k')$ and $w_t(k')$ are orthogonal cover codes (OCCs) consisting of 1 or −1, Δ is a subcarrier offset of a DMRS RE designated as one of {0 or 1} and {0 or 2 or 4}, and r(m) is a pseudo-random sequence generated by Equation (2), below.

$$r(n) = \frac{1}{\sqrt{2}}(1 - 2 \cdot c(2n)) + j\frac{1}{\sqrt{2}}(1 - 2 \cdot c(2n+1)) \qquad (2)$$

$$c_{init} = (2^{17}(N_{symb}^{slot}n_{s,f}^\mu + l + 1)(2N_{ID}^{n_{SCID}} + 1) + 2N_{ID}^{n_{SCID}} + n_{SCID})\bmod 2^{31}$$

Looking through the structure of the input sequence $\tilde{a}_{k,l}^{(\tilde{p}_0,\mu)} \sim \tilde{a}_{k,l}^{(\tilde{p}_v,\mu)}$, in 5-00 of FIG. 5, according to Equation (1), $\tilde{a}_{k,l}^{(\tilde{p}_i,\mu)}$ may be a function of k and l, that is, a function of frequency and time positions of the DMRS RE, and may not be a function of an allocated DMRS port index $\tilde{p}_i$. That is, as shown in 5-05 of FIG. 5, two different DMRS ports transmitted to an RE located at the same position may have the same sequence value.

For example, when two different DMRS ports $\tilde{p}_0$ and $\tilde{p}_1$ are allocated to the UE as in 5-05 of FIG. 5, the two DMRS ports set forth above may have the same sequence value corresponding to $r_x(y)$ in an RE located at a subcarrier x and an OFDM symbol y. In a UL codebook W supported by NR, there may be rows in which the total sum of elements equals 0 in some cases, similar to the example of Table 4, below. Under the two conditions set forth above, that is, 1) when there are rows in which the total sum of elements equals 0 and 2) when two different DMRS ports use the same sequence value, a signal is transmitted on a particular UL TX antenna port, whereas a signal may not be transmitted on the other UL TX antenna. That is, transmission power may be non-uniformly distributed between the UL TX antenna ports. As an example, when W such as the second column of Table 4 is applied to the sequence of 5-05 of FIG. 5, a signal is transmitted on the UL TX antenna port $p_0$, whereas transmission power may be 0 on the UL TX antenna port $p_1$.

TABLE 4

| TPMI index | W (ordered from left to right in increasing order of TPMI index) | | |
|---|---|---|---|
| 0-2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

Assuming that the UL TX antenna ports $p_0$ and $p_1$ use independent power amplifiers (PAs) and maximum UL transmission power of the UE is 1, when uniform transmission power distribution is allowed for each UL TX antenna port, a PA having a maximum output of 0.5 may be used. However, when non-uniform transmission power distribution occurs as above, a PA having a maximum output of 1 may be used for each UL TX antenna port, or a power backoff of 0.5 may need to be applied when the corresponding precoder is used. This means that non-uniform transmission power distribution may increase the implementation cost of the UE or may deteriorate UL transmission coverage with respect to a particular precoder.

Hereinafter, a BS is an entity performing resource allocation for a terminal and may include at least one of a gNode B, a gNB, an eNode B, a Node B, a radio access unit, a base station controller, or a node on a network. A terminal may include a UE, a mobile station (MS), a cellular phone, a smart phone, a computer, or a multimedia system capable of performing communication functions. In addition, although embodiments of the disclosure are described hereinafter by taking an NR or LTE/LTE-A system as an example, the embodiments of the disclosure may also be applied to other communication systems having similar technical backgrounds or channel types by making some changes or modifications without departing from the spirit and scope of the disclosure.

Methods according to the disclosure are not limited to particular kinds of systems and may be applied to both frequency division duplexing (FDD) and time division duplexing (TDD) systems.

Upper signaling may refer to a signal transmission method in which a gNB transmits a signal to a UE by using a DL data channel of a physical layer or the UE transmits a signal to the gNB by using a UL data channel of a physical layer. Upper signaling may also be referred to as radio resource control (RRC) signaling, packet data convergence protocol (PDCP) signaling, or a medium access control (MAC) control element (MAC CE).

Hereinafter, although the disclosure is described with reference to several embodiments, these embodiments are not independent of each other, and one or more embodiments may be applied simultaneously or in combination.

According to an embodiment of the disclosure, a method of equalizing UL transmission power by sequence mapping modification may be provided.

Figure 6:
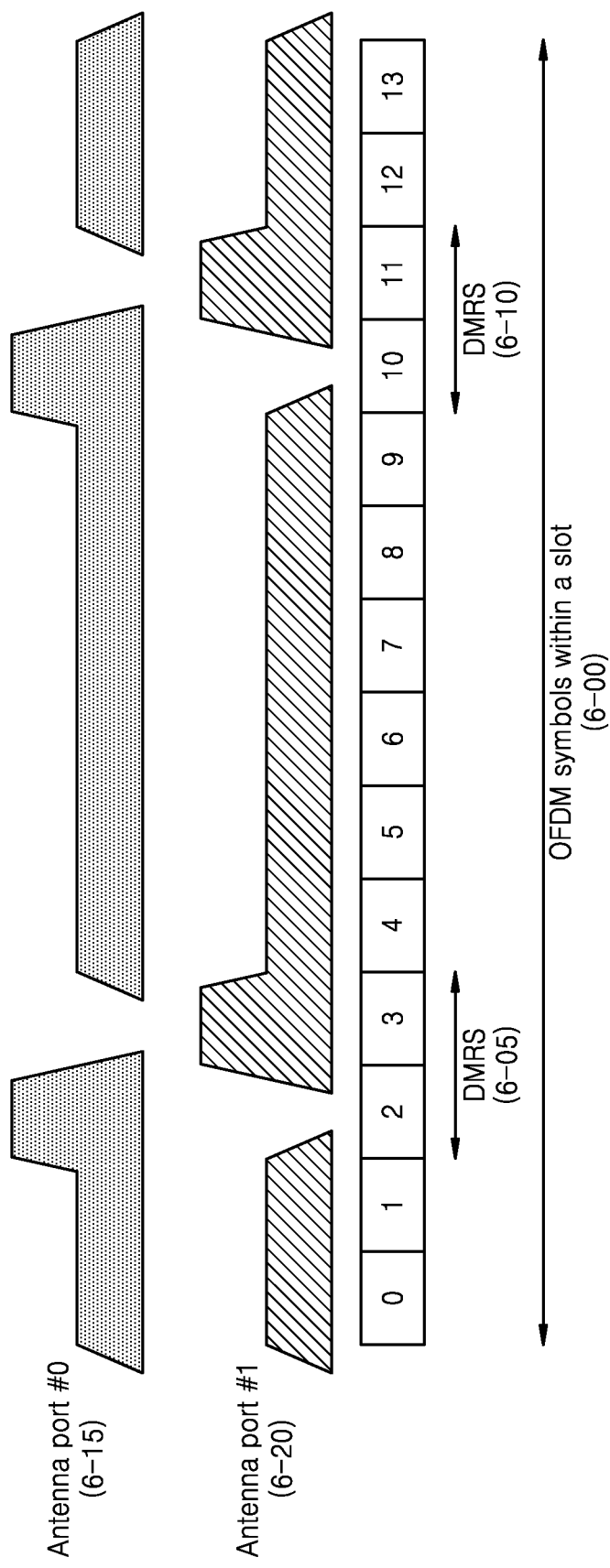
FIG. 6 is a diagram illustrating an example in which non-uniform transmission power allocation between uplink antennas is performed in codebook-based uplink transmission, according to an embodiment.

FIG. 6 is a diagram illustrating an example in which non-uniform transmission power allocation between UL antennas is performed in codebook-based UL transmission, according to an embodiment. More particularly, FIG. 6 is a diagram illustrating an example of DMRS power imbalance, according to the description given above.

Referring to FIG. 6, cases 6-05 and 6-10 are shown, wherein a total of 4 DMRSs are transmitted to number (2, 3) and number {10, 11} OFDM symbols within one UL slot 6-00 including 14 OFDM symbols. According to the description given with reference to FIG. 5, in the case of a DMRS, the imbalance of transmission power between UL TX antenna ports may occur when a particular precoder is used. In particular, in the case of NR specifications only supporting wideband UL precoding, the corresponding imbalance may occur throughout the whole band. As shown in FIG. 6, because transmission power allocation is not made at particular positions (i.e., number 3 and number 11 OFDM symbols in FIG. 6) with respect to a PA of an antenna port 0, when full power transmission is assumed, twice the transmission power may need to be allocated to a PA of an antenna port 1 at the corresponding positions.

On the other hand, in the case of data, because the value of the input sequence $\tilde{a}_{k,l}^{(\tilde{p}_0,\mu)} \sim \tilde{a}_{k,l}^{(\tilde{p}_v,\mu)}$ for each layer is randomized by a data symbol value, transmission power imbalance as in a DMRS does not occur in terms of an OFDM symbol, and an average uniform transmission power may be allocated as in number (0, 1, 4, 5, 6, 7, 8, 9, 12, 13) OFDM symbols in FIG. 6.

In an embodiment of the disclosure, a phase rotation factor β may be introduced when DMRS sequence mapping is performed, that is, when $\tilde{a}_{k,l}^{(\tilde{p}_i,\mu)}$ of Equation (1) is generated. For example, Equation (1) may be changed to include a phase rotation factor β having at least one of a frequency position of a DMRS RE (which includes a subcarrier position/offset or an RB position/offset, and is hereinafter referred to as a DMRS RE frequency position), a DMRS port number, or a layer number, as shown in Equation (3), below.

$$\tilde{a}_{k,l}^{(\tilde{p}_i,\mu)} = w_f(k')w_t(l')r(2n+k') \times \beta| \qquad (3)$$

In Equation (3), as an example of β, by making $\beta = e^{j\pi k}$ (where k is a subcarrier number or a PRB number), the phase of the sequence $\tilde{a}_{k,l}^{(\tilde{p}_i,\mu)}$ may be changed according to the subcarrier position or PRB position of the DMRS RE, and thus, the transmission power imbalance may be solved. This method, despite being simple, may not be permitted to adaptively change the phase to an allocated layer number (or an allocated DMRS port number).

In Equation (3), as another example of β, by making $$\beta = e^{\frac{j2\pi\rho}{v}}$$

(where v is the number of layers (the number of allocated DMRS ports), and ρ is the order of allocated DMRS ports), the phase of the sequence $\tilde{a}_{k,l}^{(\tilde{p}_i,\mu)}$ may be differentially changed for each DMRS port, and thus, the transmission power imbalance may be mitigated. Although this method may adaptively change the phase to the allocated layer number (or the allocated DMRS port number), because there may be no additional change in phase according to the DMRS RE frequency position, variability may be somewhat limited.

Referring to Equation (3), in another example of β, by making $$\beta = e^{\frac{j2\pi\rho}{v}} e^{j\pi k}$$

(where k is a subcarrier number or PRB number, v is the number of layers (the number of allocated DMRS ports), and ρ is the order of allocated DMRS ports), the phase of the sequence $\tilde{a}_{k,l}^{(\tilde{p}_i,\mu)}$ may be differentially changed for each DMRS port simultaneously by making an additional change in phase according to the DMRS RE frequency position, and thus, the transmission power imbalance may be mitigated.

This method, despite being complicated, may include all the advantages of the examples described above.

Figure 7:
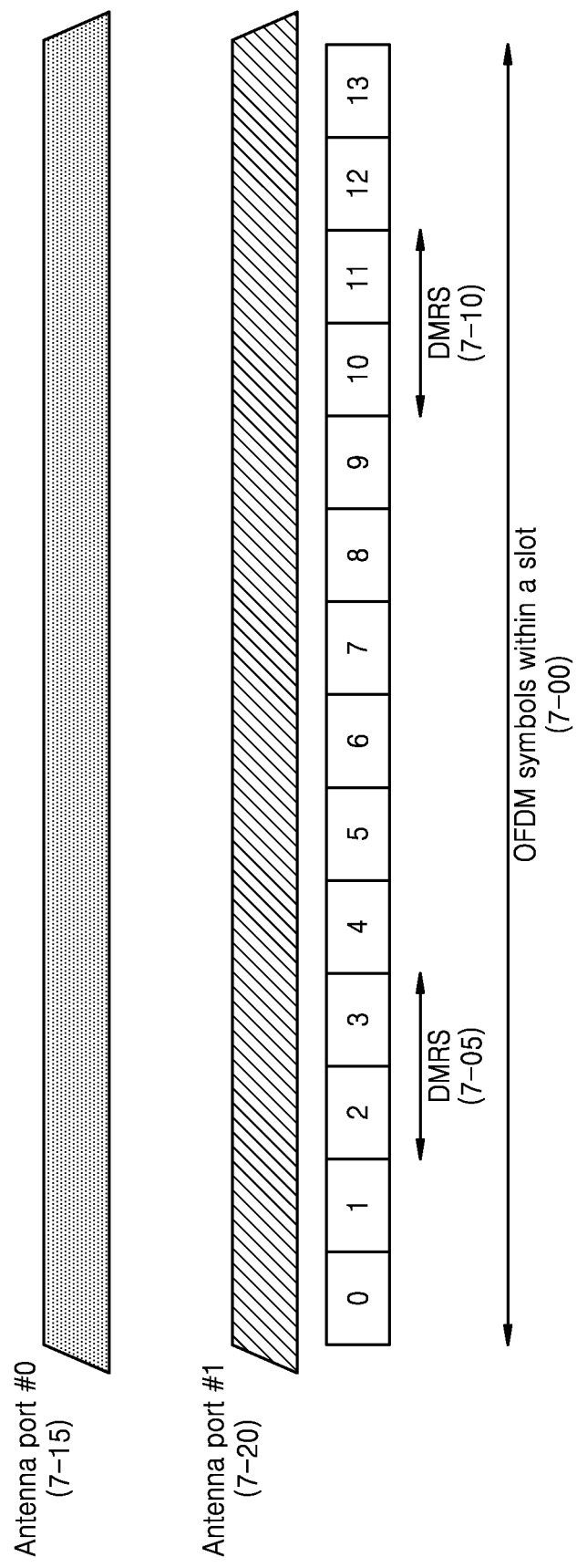
FIG. 7 is a diagram illustrating an example in which uniform transmission power allocation between uplink antennas is performed in codebook-based uplink transmission, according to an embodiment.

The UE according to an embodiment of the disclosure may allocate, based on one of the methods set forth above, uniform transmission power to all UL TX antennas in all OFDM symbols 7-00 within a slot including DMRS OFDM symbols 7-05 and 7-10, as shown in FIG. 7.

According to an embodiment of the disclosure, a method of equalizing UL transmission power by UL precoding modification is provided.

As described above, FIG. 6 is a diagram illustrating an example in which non-uniform transmission power allocation between UL antennas in codebook-based UL transmission is performed, according to an embodiment of the disclosure. That is, FIG. 6 is a diagram illustrating an example of DMRS power imbalance, according to the description given above.

FIG. 6 illustrates cases 6-05 and 6-10, in which a total of 4 DMRSs are transmitted to the number {2, 3} and number {10, 11} OFDM symbols within one UL slot 6-00 that includes 14 OFDM symbols. According to the description given with reference to FIG. 5, in the case of a DMRS, an imbalance of transmission power between UL TX antenna ports may occur when a particular precoder is used. In particular, in the case of current NR specifications only supporting wideband UL precoding, the corresponding imbalance may occur throughout the whole band.

As shown in FIG. 6, because transmission power allocation is not made at particular positions (i.e., number 3 and number 11 OFDM symbols) with respect to the PA of the antenna port 0, when full power transmission is assumed, twice the transmission power may need to be allocated to the PA of the antenna port 1 at the corresponding positions. On the other hand, in the case of communicating data, because the value of the input sequence $\tilde{a}_{k,l}^{(\tilde{p}_0,\mu)} \sim \tilde{a}_{k,l}^{(\tilde{p}_v,\mu)}| \ldots$ for each layer is randomized by a data symbol value, transmission power imbalance as in a DMRS does not occur in terms of an OFDM symbol, and an average uniform transmission power may be allocated as in the number {0, 1, 4, 5, 6, 7, 8, 9, 12, 13} OFDM symbols in FIG. 6.

To mitigate the effects of an imbalance, the phase rotation factor $\beta$ may be introduced when a UL precoder, that is, W of case 5-00 of FIG. 5, is generated. For example, W of case 5-00 of FIG. 5 may be changed to include the phase rotation factor $\beta$ having, as a factor, at least one of a DMRS RE frequency position, a DMRS port number, a layer number, or frequency domain resource allocation information, as shown in Equation (4), below.

$$\begin{bmatrix} a_{k,l}^{(p_0,\mu)} \\ \vdots \\ a_{k,l}^{(p_{\rho-1},\mu)} \end{bmatrix} = \beta_{PUSCH}^{DMS} \times \beta W \times \begin{bmatrix} \tilde{a}_{k,l}^{(\tilde{p}_0,\mu)}(m) \\ \vdots \\ \tilde{a}_{k,l}^{(\tilde{p}_{v-1},\mu)}(m) \end{bmatrix} \quad (4)$$

In Equation (4), $\beta$ is a unitary matrix having a size of [$\rho \times \rho$], wherein $\rho$ denotes the number of UL TX antenna ports. In an embodiment of the disclosure, as one of candidates for $\beta$, a row permutation matrix having a form of Equation (5), below, may be considered.

$$\beta = [e_{\pi(1)} \ldots e_{\pi(\rho)}]^T| \quad (5)$$

In Equation (5), $e_i$ may denote a column vector in which an $i^{th}$ element is 1 and the other elements are 0, and $\pi$ may denote a permutation function as represented by Equation (6), below.

$$\pi = \begin{pmatrix} 1 & 2 & \cdots & \rho \\ f_1(k) & f_2(k) & \cdots & f_\rho(k) \end{pmatrix} \quad (6)$$

In Equation (6), an $i^{th}$ column $$\pi(i) = \begin{pmatrix} i \\ f_i(k) \end{pmatrix}$$

means that the number i is substituted with $f_i(k)$, and has a characteristic of $f_i(k) \ne f_j(k)$ when $i \ne j$.

In Equation (6), the function $f_i(k)$ is a function having, as a factor, at least one of a DMRS RE frequency position, a DMRS port number or index, a layer number, or a UL TX antenna port number or index, and may have various permutation granularities. The permutation granularity set forth above may denote how often the resulting value of $f_i(k)$ varies according to conditions. The permutation granularity will be described again in detail with reference to the following examples.

When the UL TX antenna port number is $\rho=2$ and the number of layers is $v=2$, an example of $\beta$ and an example of $\pi$ are as follows.

$$\pi = \begin{pmatrix} 1 & 2 \\ k \bmod 2 & (k+1) \bmod 2 \end{pmatrix} \quad (7)$$

$$\beta = \begin{cases} \begin{bmatrix} 1 & 0 \\ 0 & 1 \end{bmatrix}, & \text{where } k \text{ satisfies condition } A \\ \begin{bmatrix} 0 & 1 \\ 1 & 0 \end{bmatrix}, & \text{where } k \text{ does not satisfy condition } A \end{cases}$$

When Equation (7) is substituted into Equation (4), W is used as it is when a particular condition is satisfied, and that W in which a first row has been exchanged with a second row is used when the particular condition set forth above is not satisfied.

In Equation (7), k may adopt, for example, the values of $\Delta$ (the subcarrier offset of the DMRS RE) to n (the DMRS RB index). In Equation (7), the condition A may be appropriately determined by the adopted values set forth above and DMRS settings. As an example, when the value of $\Delta$ is used as k in the type 1 DMRS, condition A may be satisfied by denoting $\Delta=0$. On the other hand, condition A may not be satisfied by denoting $\Delta=2$. Although various modifications may be made in addition thereto, all possibilities are not listed because there is a risk of making the subject matter of the disclosure unclear.

When the UL TX antenna port number or the layer number is greater than 2, the permutation rule described above may need to be cyclically applied. As an example, when 4-layer transmission is performed by using 4 UL TX antenna ports, in the case where a TPMI index is specified as 3, the UE may use the following codebook, shown below in Equation (8).

$$W = \frac{1}{4} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (8)$$

When Equation (8) is applied to the above description of the non-uniform allocation of transmission power, a transmission power of 1 may be allocated to a first UL TX antenna port, and no transmission power may be allocated to the remaining second to fourth UL TX antenna ports. In this case, when one row permutation matrix is used, although a transmission power of 1/2 may be allocated to two antennas, no transmission power may still be allocated to the remaining two antennas.

The permutation function $f_t(k)$ of Equation (6) may be configured as a combination of a UL TX antenna port and a UL DMRS RE frequency position. For example, a modulo operation by a UL TX antenna port number is applied to a DMRS RE frequency position, and β may vary according to the value of the DMRS RE frequency position. When the UL TX antenna port number is ρ=4 and the number of layers is v=4, an example of β may be provided in accordance with Equation (9), below.

$$\beta_{k|(k \bmod \rho)=0} = \begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

$$\beta_{k|(k \bmod \rho)=1} = \begin{bmatrix} 0 & 0 & 0 & 1 \\ 1 & 0 & 0 & 0 \\ 0 & 1 & 0 & 0 \\ 0 & 0 & 1 & 0 \end{bmatrix},$$

$$\beta_{k|(k \bmod \rho)=2} = \begin{bmatrix} 0 & 0 & 1 & 0 \\ 0 & 0 & 0 & 1 \\ 1 & 0 & 0 & 0 \\ 0 & 1 & 0 & 0 \end{bmatrix},$$

$$\beta_{k|(k \bmod \rho)=3} = \begin{bmatrix} 0 & 1 & 0 & 0 \\ 0 & 0 & 1 & 0 \\ 0 & 0 & 0 & 1 \\ 1 & 0 & 0 & 0 \end{bmatrix}. \quad (9)$$

When Equations (8) and (9) are substituted into Equation (4), because a position of a UL TX antenna port allocated a transmission power of 1 is circulated according to the DMRS RE frequency position, equal transmission power may be allocated to all the UL TX antenna ports in terms of an OFDM symbol.

The above example is a configuration of the permutation matrix β, and it will be understood by those of ordinary skill in the art that the method according to the disclosure, when applied, is not limited to the example set forth above and may use various modifications (i.e., the configuration order of the permutation matrix row vector and the application order of the permutation matrix may be changed).

Methods regarding the permutation granularity are described in detail based on the examples set forth above. The transmission power imbalance may be mitigated by using one or more different β's at different frequency positions with respect to a DMRS transmitted in one OFDM symbol. In the following description, different β's, as set forth above, will be represented as $\beta_0, \beta_1, \ldots, \beta_n$.

Figure 8:
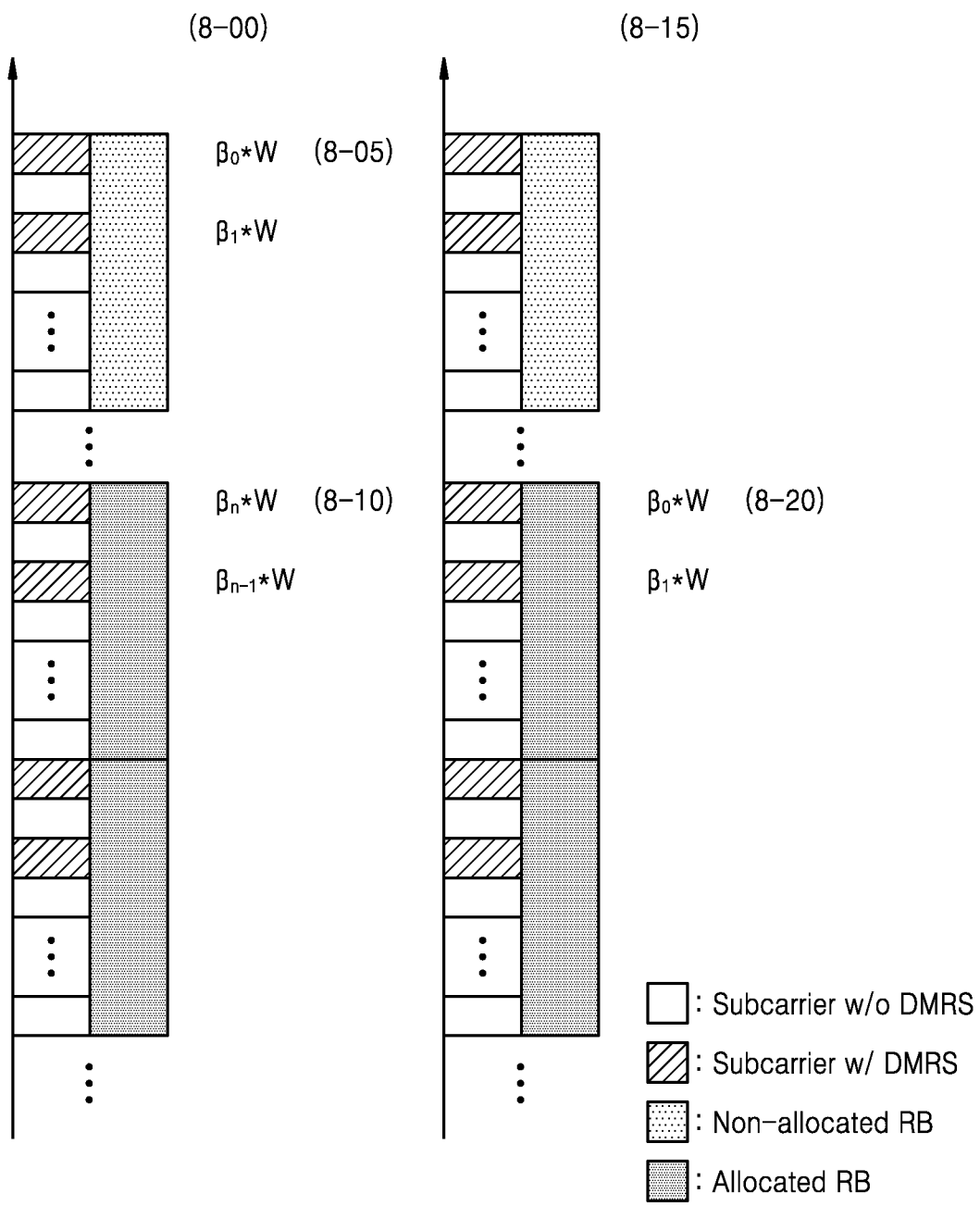
FIG. 8 is a diagram illustrating a method of applying an uplink codebook, according to an embodiment.

FIG. 8 is a diagram illustrating a method of applying a UL codebook, according to an embodiment. Specifically, FIG. 8 is a diagram illustrating examples of a permutation granularity at a subcarrier level.

Referring to FIG. 8, a gNB and a UE may apply different β's to respective subcarriers on which a DMRS within one OFDM symbol is transmitted. Here, according to the definition of a start point of a particular β, that is, $\beta_0$, there may be two different methods, that is, a method of determining $\beta_0$ regardless of an allocated RB (for PUSCH) as shown in 8-00 of FIG. 8, and a method of determining $\beta_0$ in accordance with an allocated RB (for PUSCH) as shown in 8-15 of FIG. 8.

In 8-00 of FIG. 8, the gNB and the UE may begin with a fixed point, for example, $\beta_0$ (see 8-05 of FIG. 8) on a subcarrier 0 within a common resource block 0, regardless of an allocated RB (for PUSCH), and may sequentially apply the next β's (i.e., $\beta_1$) to subcarriers on which the DMRS is transmitted. When the start point is not consistent between the allocated RB and the common resource block 0, the UE may apply β's starting from a permutation matrix satisfying $\beta_{n \neq 0}$ as in 8-10 of FIG. 8. According to this method, even though UEs are indicated by different allocation RBs, because the same permutation matrix may be applied within the same frequency resource, MU MIMO may be supported.

On the other hand, according to 8-15 of FIG. 8, the gNB and the UE may start to apply a first permutation matrix, that is, $\beta_0$ (see 8-20 of FIG. 8), on a first DMRS subcarrier within a start RB of an allocated RB (for PUSCH) and may sequentially apply the next β's to subcarriers on which the DMRS is transmitted. According to this method, when UEs are indicated by different allocation RBs, although a different permutation matrix is applied on a UE basis within the same frequency resource, the implementation of the UE is simplified.

Figure 9:
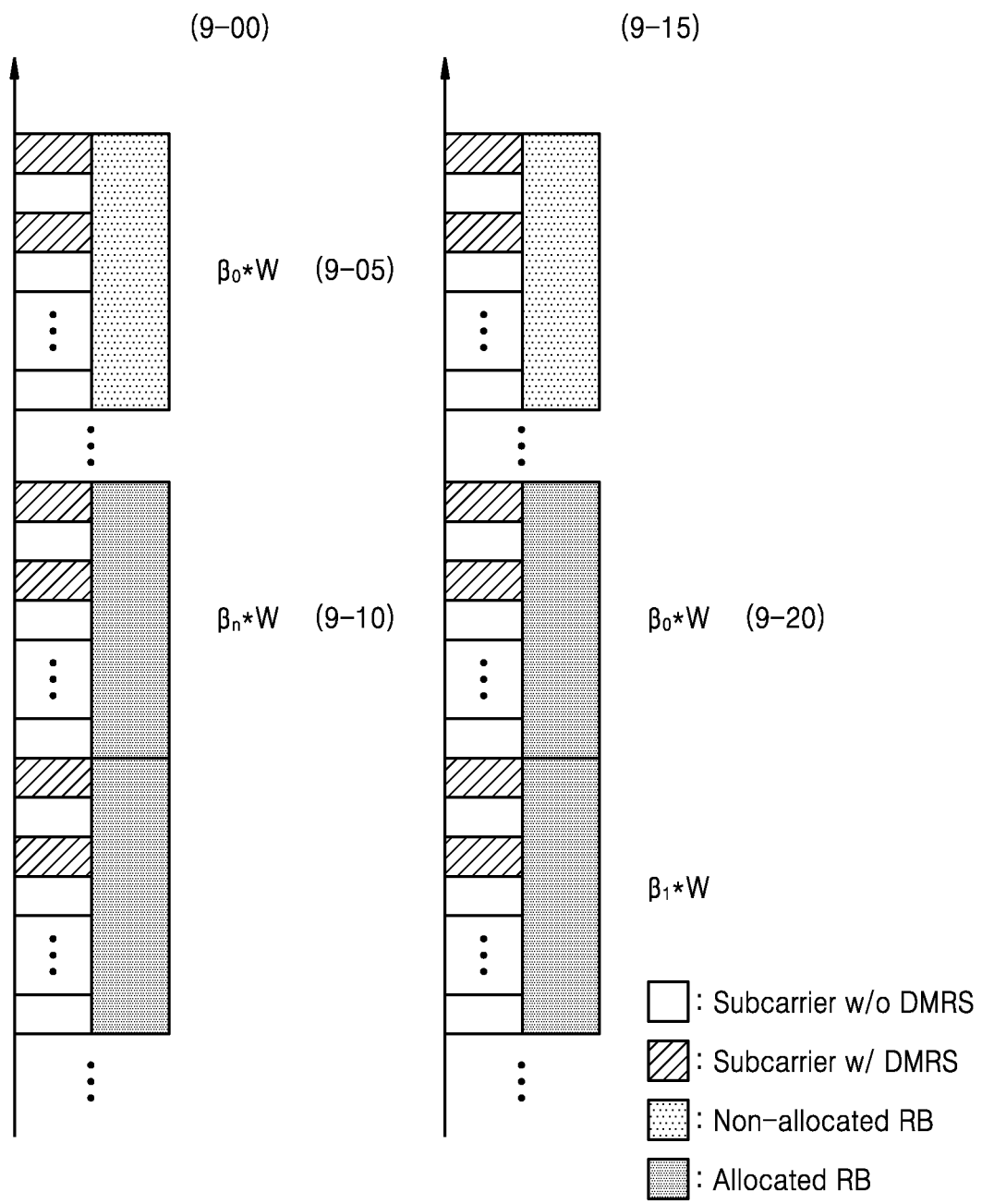
FIG. 9 is a diagram illustrating a method of applying an uplink codebook, according to an embodiment.

FIG. 9 is a diagram illustrating a method of applying a UL codebook, according to an embodiment. Specifically, FIG. 9 is a diagram illustrating examples of a permutation granularity at an RB level or a subband level. Referring to FIG. 9, a gNB and a UE may apply different β's to respective RBs or subcarriers on which a DMRS within one OFDM symbol is transmitted.

Although a subband level permutation exhibits outstanding precoding randomization performance for transmission power equalization, the subband level permutation has a risk of deterioration in channel estimation performance for PUSCH decoding due to frequent changes in precoding. By increasing a permutation granularity to the RB level or the subband level, a channel estimation unit for PUSCH decoding may be maintained to be equal to or greater than a certain size while precoding randomization for transmission power equalization is appropriately maintained, and thus, the degree of performance deterioration may be minimized.

Here, according to the definition of a start point of $\beta_0$, there may be two different methods. That is, a method of determining $\beta_0$ regardless of an allocated RB (for PUSCH) as shown in 9-00 of FIG. 9, and a method of making $\beta_0$ to be variable in accordance with an allocated RB (for PUSCH) as shown in 9-15 of FIG. 9 is provided.

Referring to 9-00 of FIG. 9, the gNB and the UE may apply, for example, a first permutation matrix, $\beta_0$ (see 9-05 of FIG. 9) to all DMRS subcarriers within a common resource block 0 at a fixed point regardless of an allocated RB (for PUSCH), and may sequentially apply the next β's to common resource block indices. When the start point is not consistent between the allocated RB and the common resource block 0, the UE may apply β's to a start RB of the allocated RB, starting from a permutation matrix satisfying $\beta_{n \neq 0}$, as shown in 9-10 of FIG. 9. According to the method set forth above, even though UEs are indicated by different allocation RBs, because the same permutation matrix may be applied within the same frequency resource, MU MIMO may be supported.

On the other hand, referring to 9-15 of FIG. 9, the gNB and the UE may start to apply a first permutation matrix, that is, $\beta_0$ (see 9-20 of FIG. 9) to DMRS subcarriers within a start RB of an allocated RB (for PUSCH) and may sequentially apply the next $\beta$'s on an RB basis. According to this method, when UEs are indicated by different allocation RBs, although a different permutation matrix is applied on a UE basis within the same frequency resource, implementation of the UE may be simplified and improved.

It will be understood by those of ordinary skill in the art that the above-described methods illustrated in 9-00 and 9-15 of FIG. 9 may also be applied to a subband level permutation granularity including one or more RBs.

Figure 10:
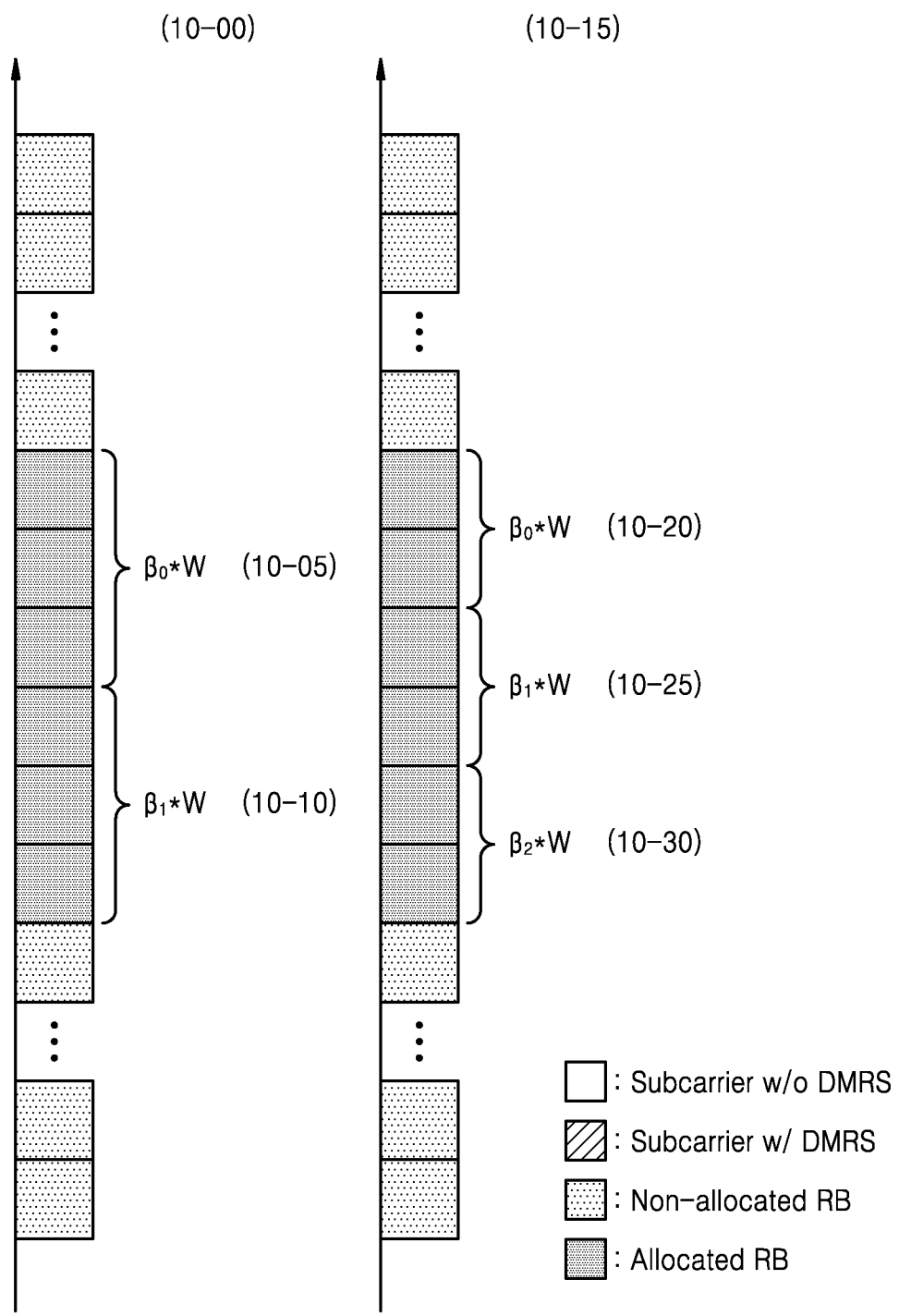
FIG. 10 is a diagram illustrating a method of applying an uplink codebook, according to an embodiment.

FIG. 10 is a diagram illustrating a method of applying a UL codebook, according to an embodiment. Specifically, FIG. 10 is a diagram illustrating examples of a maximum (UL TX antenna port level) permutation granularity.

Referring to FIG. 10, a gNB and a UE may divide a frequency band, in which a DMRS within one OFDM symbol is transmitted, into groups by up to the number of UL TX antenna ports and may apply different $\beta 3$'s to the respective groups, corresponding to a minimum requirement for uniform transmission power distribution for each UL TX antenna port, that is, a maximum permutation granularity.

According to the method described above, because minimum precoding randomization for transmission power equalization may be provided and a channel estimation unit for PUSCH decoding may be maximized, performance may be improved.

When there are two UL TX antenna ports, an allocated RB may be divided into two groups, e.g., $\beta_0$ (see 10-05 of FIG. 10) may be allocated to a first RB group, and $\beta_1$ (see 10-10 of FIG. 10) may be allocated to a second RB group (10-00 of FIG. 10). When there are three UL TX antenna ports, an allocated RB may be divided into three groups, $\beta_0$ (see 10-20 of FIG. 10) may be allocated to a first RB group, $\beta_1$ (see 10-25 of FIG. 10) may be allocated to a second RB group, and $\beta_2$ (see 10-30 of FIG. 10) may be allocated to a third RB group. It will be understood by those of ordinary skill in the art that, even when there are four UL TX antenna ports, an extension may be made in a similar manner.

The UE may allocate, based on one of the methods described above, uniform transmission power to all UL TX antenna ports in all OFDM symbols (see 7-00 of FIG. 7) within a slot including the DMRS OFDM symbols (for example, 7-05 and 7-10 of FIG. 7).

Although certain details of the disclosure has been described in terms of DMRS transmission, this is merely an example, and it will be understood by those of ordinary skill in the art that the descriptions made above may also be applied to PUSCH transmission in a similar manner.

The gNB may selectively apply the UL DMRS sequence mapping, or $\beta$ for UL precoder modification, which has been described above, for the purpose of coexistance between a new UE and an existing UE, or for UL MU MIMO support. Accordingly, the gNB may semi-statically determine whether and/or how to apply $\beta$ based on upper layer signaling, or may dynamically determine whether or not to apply $\beta$ by L1 signaling, such as data center interconnect (DCI). Alternatively, since non-uniform transmission power allocation for each UL TX antenna port occurs only in some UL codebooks, the UE may apply $\beta$, as set forth above, in accordance with one of the above-described embodiments when a TPMI within a UL grant indicates a particular codebook having a trouble.

Figure 11:
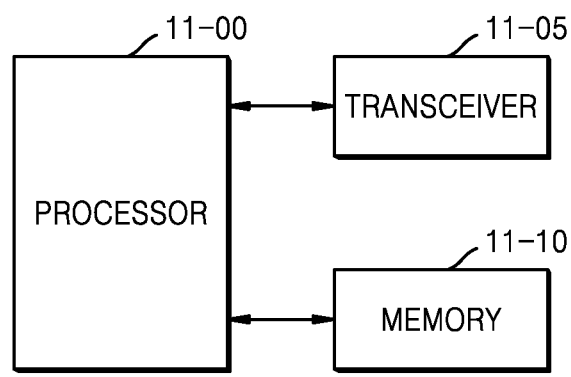
FIG. 11 is a block diagram illustrating an internal structure of a user equipment, according to an embodiment.

FIG. 11 is a block diagram illustrating an internal structure of a UE, according to an embodiment. The UL DMRS sequence mapping, the UL precoder modification method, and the transmission-reception method of the UE, which respectively correspond to the aforementioned embodiments of the disclosure, have been described. In order to perform these methods, each of a transmitter, a receiver, and a processor of the UE may be operated, according to the embodiments of the disclosure.

Specifically, FIG. 11 is a block diagram illustrating the internal structure of the UE, according to an embodiment of the disclosure. As shown in FIG. 11, the UE may include a processor 11-00, a transceiver 11-05, and a memory 11-10. However, components of the UE are not limited to the examples set forth above. For example, the UE may include more components or less components than the components set forth above. In addition, the processor 11-00, the transceiver 11-05, and the memory 11-10 may be implemented in the form of one chip.

The processor 11-00 may control a series of processes in which the UE may be operated according to the above-described embodiments of the disclosure. For example, according to the UL DMRS sequence mapping or the UL precoder modification method, processes of the UL DMRS sequence mapping or the UL precoder modification of the UE may be controlled differently.

The transceiver 11-05 may transmit a signal to and receive a signal from a gNB. The signal set forth above may include control information and data. For this purpose, the transceiver 11-05 may include a radio frequency (RF) transmitter up-converting and amplifying a frequency of a transmitted signal, and an RF receiver performing low-noise amplification and frequency down-conversion on a received signal. In addition, the transceiver 11-05 may receive a signal through a radio channel and output the signal to the processor 11-00, and may transmit, through the radio channel, a signal that is output from the processor 11-00.

The memory 11-10 may store at least one of information transmitted and received by the transceiver 11-05 or information generated by the processor 11-00. In addition, the memory 11-10 may store control information or data included in an acquired signal. The memory 11-10 may include a storage medium such as read-only memory (ROM), random access memory (RAM), a hard disk, a compact disc ROM (CD-ROM), and a digital versatile disc (DVD), or a combination of storage media. Further, the memory 11-10 may include a plurality of memories.

Figure 12:
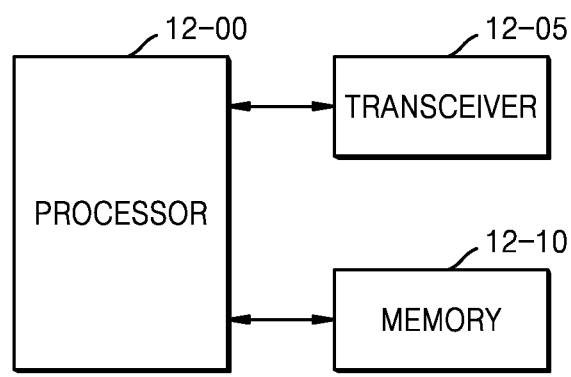
FIG. 12 is a block diagram illustrating an internal structure of a base station, according to an embodiment.

FIG. 12 is a block diagram illustrating an internal structure of a gNB, according to an embodiment.

As shown in FIG. 12, the gNB of the disclosure may include a processor 12-00, a transceiver 12-05, and memory 12-10. However, components of the gNB are not limited to the examples set forth above. For example, the gNB may include more components or less components than the components set forth above. In addition, the processor 12-00, the transceiver 12-05, and the memory 12-10 may be implemented in the form of one chip.

According to the above-described communication method of the gNB, the transceiver 12-05 and the processor 12-00 may be operated together or separately.

The transceiver 12-05 may transmit a signal to and receive a signal from a UE. Here, the signal may include control information and data. For this purpose, the transceiver 12-05 may include an RF transmitter up-converting and amplifying a frequency of a transmitted signal, and an RF receiver performing low-noise amplification and frequency down-conversion on a received signal. However, this is merely an example of the transceiver 12-05, and components of the transceiver 12-05 are not limited to the RF transmitter and the RF receiver.

In addition, the transceiver 12-05 may receive a signal through a radio channel and output the signal to the processor 12-00, and may transmit, through the radio channel, a signal that is output from the processor 12-00.

The processor 12-00 may store a program and data required for operations of the gNB. In addition, the processor 12-00 may store control information or data included in a signal acquired by the gNB. The processor 12-00 may include a memory including a storage medium, such as a ROM, a RAM, a hard disk, a CD-ROM, and a DVD, or a combination of storage media.

The processor 12-00 may control a series of processes to allow the gNB to be operated according to the above-described embodiment of the disclosure. According to some embodiments of the disclosure, the processor 12-00 may determine the UL DMRS sequence mapping or the UL precoder modification method according to conditions, and may control each component of the gNB for receiving a DMRS and a PUSCH.

The memory 12-10 may store at least one of information transmitted and received by the transceiver 12-05 or information generated by the processor 12-00. In addition, the memory 12-10 may store control information or data included in an acquired signal. The memory 12-10 may include a storage medium such as a ROM, a RAM, a hard disk, a CD-ROM, and a DVD, or a combination of storage media. Further, the memory 12-10 may include a plurality of memories.

The embodiments of the disclosure have been provided as particular examples merely for ease of explanation of the disclosure and to aid in understanding the disclosure, Examples are not intended to limit the scope of the disclosure. That is, it will be apparent to those of ordinary skill in the art that other modifications and variations may be made without departing from the scope and spirit of the disclosure. In addition, the respective embodiments of the disclosure described above may be implemented in combination, as needed.

The methods according to the claims or embodiments of the disclosure described herein may be implemented in the form of hardware, software, or a combination of hardware and software.

When the methods are implemented by software, a computer-readable storage medium or a computer program product, which stores one or more programs (software modules), may be provided. The computer-readable storage medium may be a non-transitory computer-readable storage medium. One or more programs stored in the computer-readable storage medium or the computer program product are configured to be executable by one or more processors in an electronic device. One or more programs include instructions causing the electronic device to perform the methods according to the claims or embodiments of the disclosure described herein.

These programs (software modules or software) may be stored in RAM, non-volatile memory including flash memory, ROM, electrically erasable programmable read only memory (EEPROM), a magnetic disc storage device, CD-ROM, DVDs or other types of optical storage devices, or a magnetic cassette. Alternatively, these programs may be stored in memory including a combination of some or all of the example devices set forth above. In addition, a plurality of each constituent memory may be provided.

Further, the programs may be stored in an attachable storage device that is accessible via a communication network, such as the Internet, an intranet, a local area network (LAN), a wide LAN (WLAN), a storage area network (SAN), or a communication network including a combination thereof. Such a storage device may be connected to a device for performing the embodiments of the disclosure via an external port. In addition, a separate storage device on a communication network may be connected to a device for performing the embodiments of the disclosure.

In the above-described embodiments of the disclosure, a component included in the disclosure has been expressed in singular or plural forms according to a specifically presented embodiment. However, the expressions in singular or plural forms have been selected to suit a presented situation for descriptive convenience, and the disclosure is not limited to the component expressed in singular or plural forms. Accordingly, the component may be provided by a single quantity even though expressed in a plural form, or may be provided by a plural quantity even though expressed in a singular form.

Further, the embodiments of the disclosure may be applied to other systems, for example, LTE systems, 5G and NR systems.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method of operating a terminal for controlling transmission power of the terminal in a wireless communication system, the method comprising:
   receiving, from a base station, a set of first sequences and an identifier for indicating uplink precoding information;
   generating a set of second sequences based on the set of first sequences and the uplink precoding information; and
   transmitting, to the base station, the set of second sequences at antenna ports, wherein each of the antenna ports corresponds to each sequence included in the set of second sequences,
   wherein at least one of the set of first sequences and the uplink precoding information is generated based on a phase rotation factor,
   wherein an indicator indicating whether the phase rotation factor is used to generate the set of first sequences or to generate the uplink precoding information is received from the base station, and
   wherein in a case in which the set of first sequences is generated based on the phase rotation factor, the phase rotation factor is determined based on all three of a location of a subcarrier for a demodulation reference signal (DMRS) in a time-frequency domain, the number of allocated DMRS ports and an order of the allocated DMRS ports.

2. The method of claim 1,
   wherein in a case in which the set of first sequences is generated based on the phase rotation factor, the phase rotation factor is further determined based on a size of the set of first sequences and an index of each sequence included in the set of first sequences.

3. The method of claim 1,
wherein the uplink precoding information comprises at least one of an amplitude scaling factor or an uplink precoder matrix.

4. The method of claim 3, further comprising:
in a case in which the uplink precoding information is generated based on phase rotation factor, the phase rotation factor is a matrix, wherein a size of the matrix is determined based on a number of the antenna ports, and wherein a size of the set of first sequences is greater than or equal to 2.

5. The method of claim 4,
wherein the matrix comprises at least one of a row permutation matrix or a column permutation matrix for permutating rows or columns of the uplink precoder matrix.

6. A non-transitory computer-readable recording medium on which a program for executing the method of claim 1 is recorded.

7. A terminal for controlling transmission power of the terminal in a wireless communication system, the terminal comprising:
a transceiver; and
at least one processor configured to:
receive, from a base station, a set of first sequences and an identifier for indicating uplink precoding information,
generate a set of second sequences based on the set of first sequences and the uplink precoding information, and
transmit, to the base station, the set of second sequences at antenna ports, wherein each of the antenna ports corresponds to each of sequence included in the set of second sequences,
wherein at least one of the set of first sequences and the uplink precoding information is generated based on a phase rotation factor,
wherein an indicator indicating whether the phase rotation factor is used to generate the set of first sequences or to generate the uplink precoding information is received from the base station, and
wherein in a case in which the set of first sequences is generated based on the phase rotation factor, the phase rotation factor is determined based on all three of a location of a subcarrier for a demodulation reference signal (DMRS) in a time-frequency domain, the number of allocated DMRS ports and an order of the allocated DMRS ports.

8. The terminal of claim 7, further comprising:
in a case in which the set of first sequences is generated based on the phase rotation factor, the phase rotation factor is further determined based on a size of the set of first sequences and an index of each sequence included in the set of first sequences.

9. The terminal of claim 7,
wherein the uplink precoding information comprises at least one of an amplitude scaling factor or an uplink precoder matrix.

10. The terminal of claim 9, further comprising:
in a case in which the uplink precoding information is generated based on phase rotation factor, the phase rotation factor is a matrix, wherein a size of the matrix is determined based on a number of the antenna ports, and wherein a size of the set of first sequences is greater than or equal to 2.

11. The terminal of claim 10,
wherein the matrix comprises at least one of a row permutation matrix or a column permutation matrix for permutating rows or columns of the uplink precoder matrix.

12. A method of operating a base station for controlling transmission power of a terminal in a wireless communication system, the method comprising:
transmitting, to the terminal, a set of first sequences and an identifier for indicating uplink precoding information; and
receiving, from the terminal, a set of second sequences at antenna ports, wherein each of the antenna ports corresponds to each of sequence included in the set of second sequences, wherein the set of second sequences is generated based on the set of first sequences and the uplink precoding information,
wherein at least one of the set of first sequences and the uplink precoding information is generated based on a phase rotation factor,
wherein an indicator indicating whether the phase rotation factor is used to generate the set of first sequences or to generate the uplink precoding information is transmitted to the terminal, and
wherein in a case in which the set of first sequences is generated based on the phase rotation factor, the phase rotation factor is determined based on all three of a location of a subcarrier for a demodulation reference signal (DMRS) in a time-frequency domain, the number of allocated DMRS ports and an order of the allocated DMRS ports.

13. The method of claim 12,
wherein the uplink precoding information comprises at least one of an amplitude scaling factor or an uplink precoder matrix.

14. The method of claim 13, further comprising:
in a case in which the uplink precoding information is generated based on phase rotation factor, the phase rotation factor is a matrix, wherein a size of the matrix is determined based on a number of the antenna ports, and wherein a size of the set of first sequences is greater than or equal to 2.

15. The method of claim 14,
wherein the matrix comprises at least one of a row permutation matrix or a column permutation matrix for permutating rows or columns of the uplink precoder matrix.

* * * * *